(12) United States Patent  
Wu

(10) Patent No.: US 8,540,296 B1
(45) Date of Patent: Sep. 24, 2013

(54) SUCKING DEVICE

(71) Applicant: Hon Hai Precision Industry Co., Ltd., New Taipei (TW)

(72) Inventor: Cheng-Shiun Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/689,802

(22) Filed: Nov. 30, 2012

(30) Foreign Application Priority Data

Sep. 20, 2012 (TW) .............................. 101134504 A

(51) Int. Cl.
*B25J 15/06* (2006.01)
(52) U.S. Cl.
USPC ........................................................ 294/183
(58) Field of Classification Search
USPC ................. 294/183, 187, 64.2, 64.3; 901/40; 29/743; 414/752.1
See application file for complete search history.

(56) References Cited

U.S. PATENT DOCUMENTS

| | | | | |
|---|---|---|---|---|
| 4,736,749 A | * | 4/1988 | Lundback | 600/387 |
| 5,231,753 A | * | 8/1993 | Tanaka et al. | 29/741 |
| 5,492,566 A | * | 2/1996 | Sumnitsch | 118/500 |
| 5,572,785 A | * | 11/1996 | Tveit | 29/468 |
| 7,452,016 B2 | * | 11/2008 | Tanae | 294/64.3 |
| 7,597,370 B2 | * | 10/2009 | Tanae et al. | 294/64.3 |
| 8,231,157 B2 | * | 7/2012 | Chang et al. | 294/64.3 |
| 8,272,673 B2 | * | 9/2012 | Lindsey, Jr. | 294/183 |

* cited by examiner

*Primary Examiner* — Dean Kramer
(74) *Attorney, Agent, or Firm* — Altis Law Group, Inc.

(57) ABSTRACT

A sucking device includes a tubular body and an engaging member. The tubular body includes a through hole and an air distributing portion received in the through hole and engaged with an inner surface of a sidewall of the tubular body. The air distributing portion is arranged adjacent to a distal end of the tubular body, and includes a central air passage and a number of peripheral air passages surrounding the central air passage. The engaging member includes a bottom plate received in the through hole at the distal end and an engaging portion extending from the bottom plate and being insertably engaged in the central air passage. A gap is maintained between a circumferential outer surface of the bottom plate and the inner surface of the tubular sidewall, and the gap is in communication with the through hole through the peripheral air passages.

7 Claims, 4 Drawing Sheets

SUCKING DEVICE

BACKGROUND

1. Technical Field

The present disclosure relates to sucking devices.

2. Description of Related Art

As electronic devices such as mobile phones become smaller in size, elements used in such electronic devices, such as lenses, aperture and spacers are correspondingly made smaller. In assembly of such elements, sucking devices which have air flowing therethrough are usually used for sucking the elements to their positions.

However, as the elements become smaller, the sucking devices need to be changed for providing an appropriate air sucking force on the elements and avoiding air leaking out.

What is needed, therefore, is a sucking device, which can overcome the above shortcomings.

BRIEF DESCRIPTION OF THE DRAWINGS

Many aspects of the present sucking device can be better understood with reference to the following drawings. The components in the drawings are not necessarily drawn to scale, the emphasis instead being placed upon clearly illustrating the principles of the present sucking device. Moreover, in the drawings, like reference numerals designate corresponding parts throughout the several views.

DETAILED DESCRIPTION

Embodiments of the present sucking device will now be described in detail below and with reference to the drawings.

Figure 1:
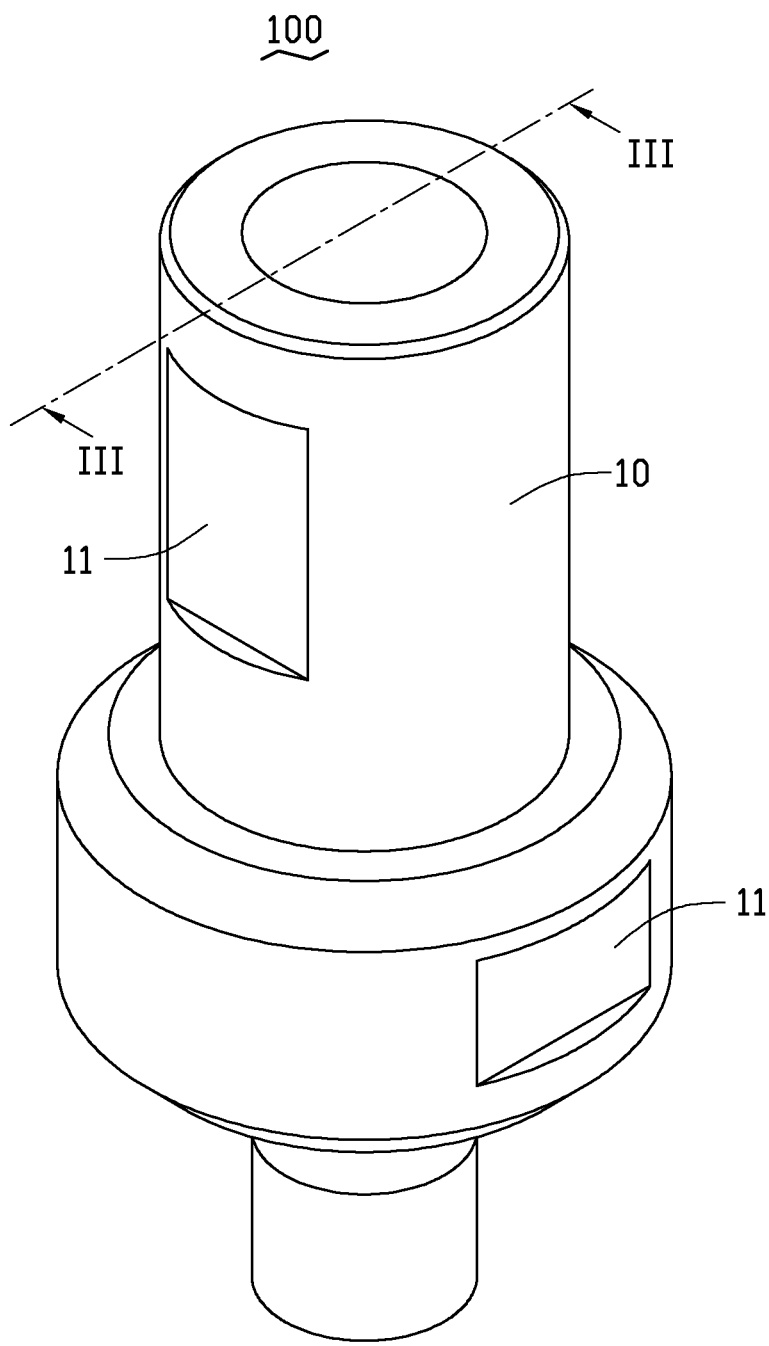
FIG. 1 is a schematic isometric view of a sucking device in accordance with an embodiment.
Figure 2:
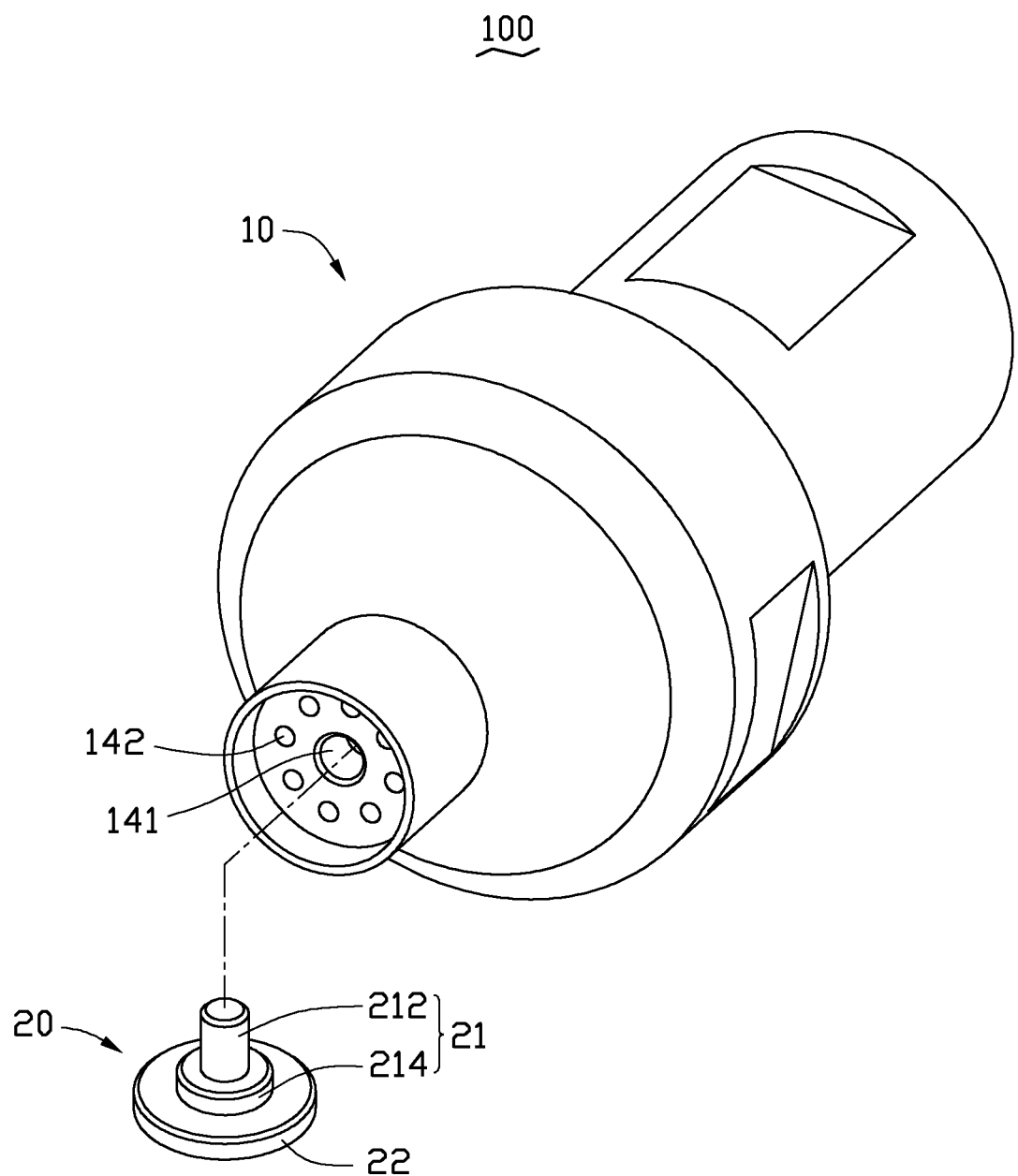
FIG. 2 is an exploded view of the sucking device of FIG. 1.
Figure 3:
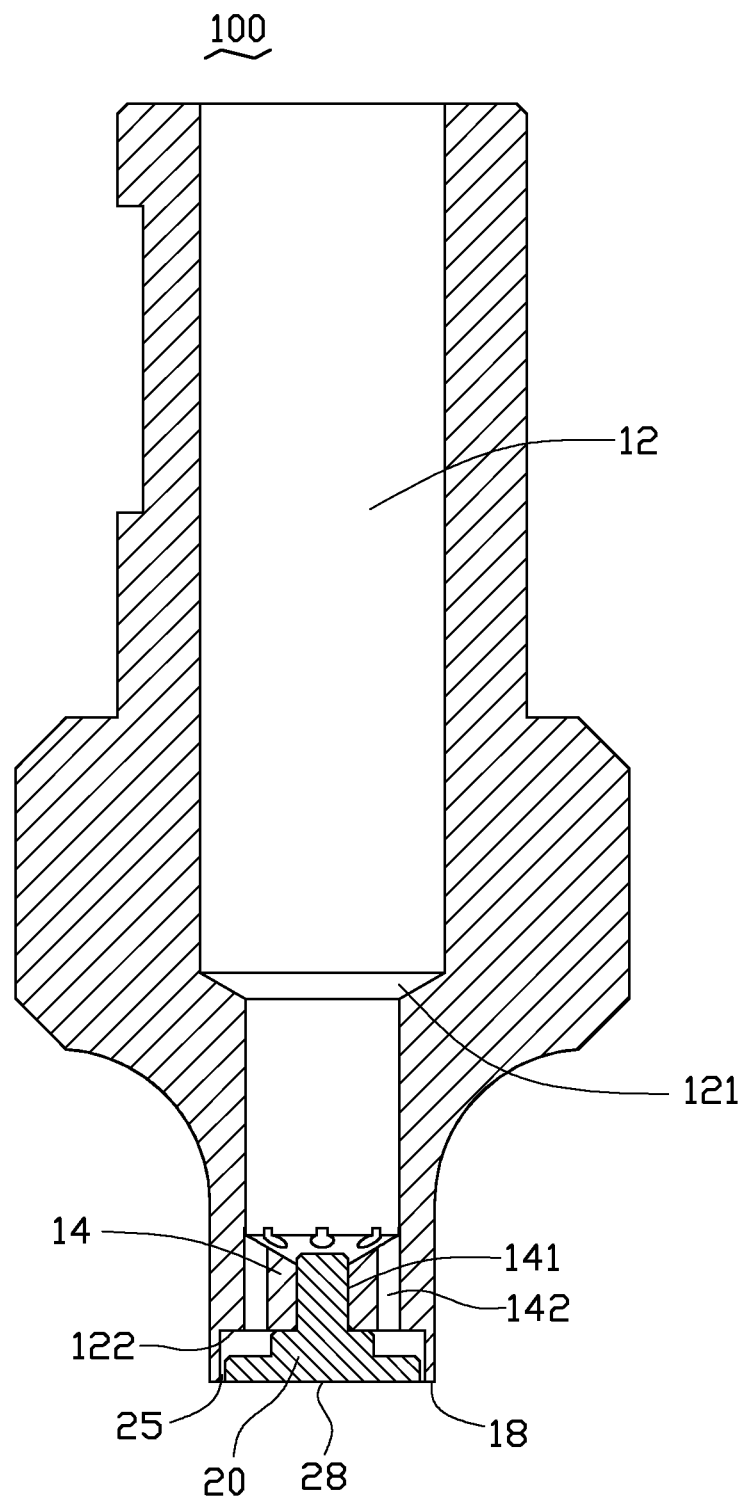
FIG. 3 a cross sectional view of the sucking device of FIG. 1, taken along line III-III.

Referring to FIGS. 1 to 3, a sucking device 100 includes a tubular body 10 and an engaging member 20.

The tubular body 10 has one or more positioning portions 11 formed at an outer surface of a sidewall of the tubular body 10, thereby facilitating positioning the tubular body 10 by a user or by a machine.

The tubular body 10 includes a through hole 12 formed along a lengthwise direction thereof for air flowing therethrough, and an air distributing portion 14 located adjacent to a distal end of the tubular body 10. In the present embodiment, the through hole 12 is formed in a center of the tubular body 10. A first inner step 121 and a second inner step 122 each are formed in the through hole 12, and configured for increasing or decreasing a size of the through hole 12, thereby controlling air flowing area. In particular, the first step 121 is formed at a middle portion of the tubular body 10, and tapers towards the air distributing portion 14; and the second step 122 is formed adjacent to the distal end of the tubular body 10, and extends outwards along a radial direction of the tubular body 10.

The air distributing portion 14 is integrally formed with the tubular body 10. The air distributing portion 14 includes a central air passage 141 and a plurality of peripheral air passages 142 surrounding the central air passage 141. The central air passage 141 is greater than the peripheral air passages 142 in size. In the present embodiment, the second step 122 has a surface flush with an end surface of the air distributing portion 14, i.e., a surface of the second step 122 is coplanar with an end surface of the air distributing portion 14.

The engaging member 20 includes an engaging portion 21 and a bottom plate 22. The engaging portion 21 includes a protrusion 212 and a base plate 214 located at an end of the protrusion 212. The bottom plate 22 is located at an end of the base plate 214. A diameter of the base plate 214 is greater than the diameter of the protrusion 212, and a diameter of the bottom plate 22 is greater than the diameter of the base plate 214. A radius of the base plate 214 is less than a distance between the central air passage 141 and one of the peripheral air passages 142.

The protrusion 212 is engaged in the central air passage 141, and the base plate 214 covers the end of the central air passage 141. As the radius of the base plate 214 is less than the distance between the central air passage 141 and one of the peripheral air passage 142, the peripheral air passages 142 are exposed by the base plate 214 towards the bottom plate 22.

A gap 25 is maintained between a circumferential outer surface of the bottom plate 22 and an inner surface of the through hole 12. The gap 25 is in communication with the through hole 12 through the peripheral air passages 142. A width W1 of the gap 25 is less than a diameter of each of the peripheral air passages 142. In the present embodiment, the width W1 is equal to or less than 0.15 mm.

A bottom surface 28 of the bottom plate 22 is flush with an end surface 18 of the tubular body 10. In the present embodiment, the bottom surface 28 and the end surface 18 are flat surface.

Figure 4:
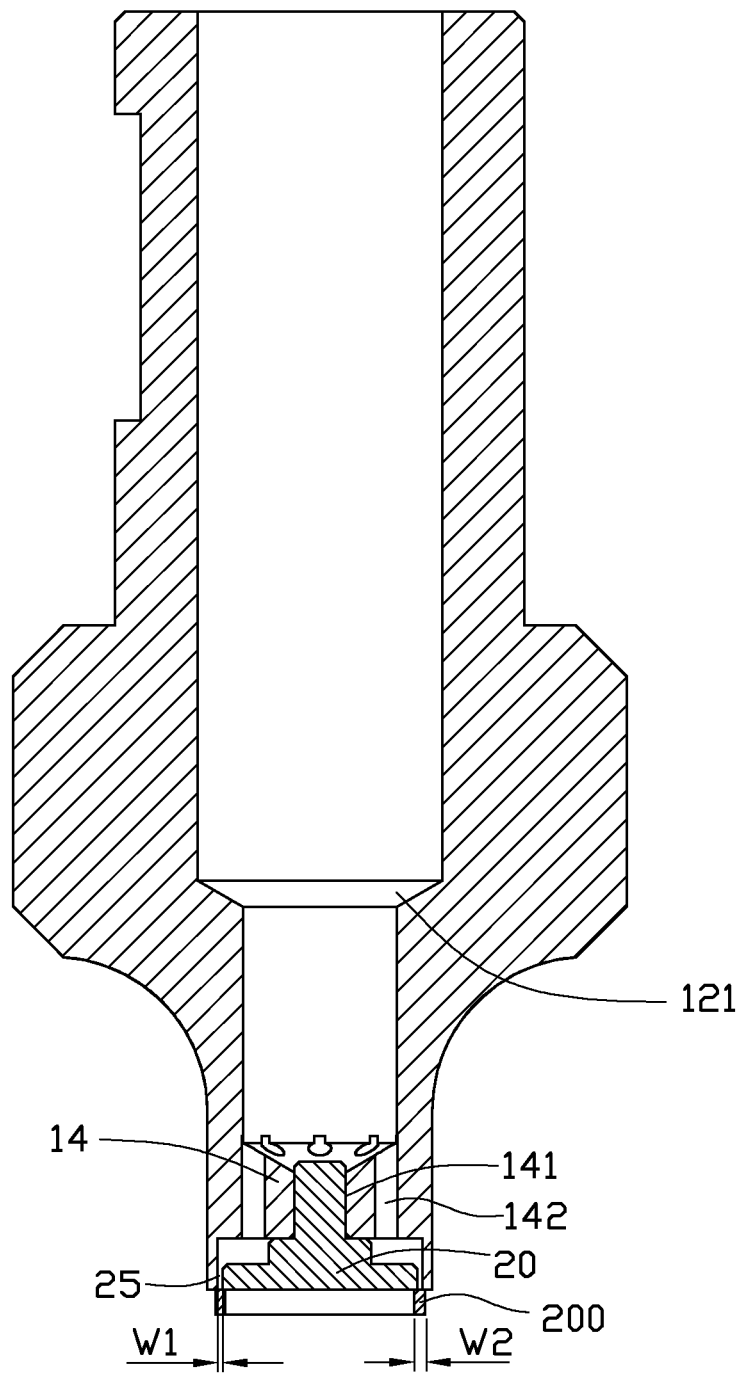
FIG. 4 shows the sucking device of FIG. 3 is sucking an element in accordance with an embodiment.

In application, the sucking device 100 can be used in element assembly. referring to FIG. 4, the engaging portion 21 of the engaging member 20 seals the central air passage 141 of the tubular body 10, and the bottom plate 22 of the engaging member 20 reduces air flowing through the tubular body 10, such that small elements 200 can be sucked by the sucking device 100. In the present embodiment, the element 200 is in a ring-shaped, and a width W2 of the element 200 is greater than the width W1 of the gap 25. For example, relative to the width W1 0.15 mm of the gap 25, the width W2 of the element 200 can be 0.2 mm.

In other embodiments, the sucking device 100 can also be used for sucking a plate-shaped element as long as the air flowing through the gap 25 has enough sucking force for the element.

Due to the engaging member 20, the sucking device 100 can be used for sucking smaller elements. The engaging member 20 can be changed according to different sizes of the elements to be sucked, for example, the diameter of the bottom plate 22 can be decreased or increased to decrease or increase air flowing through the gap 25, thereby being suitable for different sizes of the elements.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A sucking device, comprising:
a tubular body comprising a sidewall, a through hole surrounded by the sidewall and an air distributing portion received in the through hole and engaged with an inner surface of the sidewall, the air distributing portion arranged adjacent to a distal end of the tubular body, the air distributing portion comprising a central air passage and a plurality of peripheral air passages surrounding the central air passage, the tubular body further comprising a first inner step and a second inner step in the through hole, the first step tapering towards the distal end, and the second step facing toward the distal end and extending outwards along a radial direction of the tubular body; and an engaging member comprising a bottom plate received in the through hole at the distal end and an engaging portion extending from the bottom plate, the engaging portion insertably engaged in the central air passage, wherein a gap is maintained between a circumferential outer surface of the bottom plate and the inner surface of the tubular sidewall, and the gap is in communication with the through hole through the peripheral air passages.

2. The sucking device of claim 1, wherein a surface of the second step is coplanar with an end surface of the air distributing portion.

3. The sucking device of claim 1, wherein a bottom surface of the bottom plate is coplanar with an end surface of the tubular body.

4. The sucking device of claim 1, wherein the engaging portion comprises a protrusion inserted in the central air passage, and a base plate located at an end of the protrusion and covering the central air passage, the bottom plate extending from an end of the base plate and the peripheral air passages are exposed toward the bottom plate.

5. The sucking device of claim 1, wherein a width of the gap is less than a diameter of each of the peripheral air passages.

6. The sucking device of claim 5, wherein a width of the gap is equal to or less than 0.15 mm.

7. The sucking device of claim 1, wherein the tubular body comprises a plurality of positioning portions formed on an outer surface of the sidewall.

* * * * *